(12) United States Patent
Ogle et al.

(10) Patent No.: US 10,872,110 B2
(45) Date of Patent: Dec. 22, 2020

(54) SYSTEMS, APPARATUSES, METHODS AND COMPUTER-READABLE MEDIUM FOR AUTOMATICALLY GENERATING PLAYLISTS BASED ON TASTE PROFILES

(71) Applicant: SPOTIFY AB, Stockholm (SE)

(72) Inventors: Matthew S. Ogle, New York, NY (US); Christopher Johnson, New York, NY (US); Edward J. Newett, New York, NY (US); Paul S. Yu, New York, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/212,961

(22) Filed: Jul. 18, 2016

(65) Prior Publication Data

US 2016/0328409 A1 Nov. 10, 2016

Related U.S. Application Data

(63) Continuation-in-part of application No. 14/637,209, filed on Mar. 3, 2015, now Pat. No. 10,380,649.

(Continued)

(51) Int. Cl.
*G06F 16/438* (2019.01)
*G06Q 30/02* (2012.01)
*G06Q 10/10* (2012.01)
*G06Q 30/06* (2012.01)
*G06F 16/635* (2019.01)
(Continued)

(52) U.S. Cl.
CPC ........ *G06F 16/4387* (2019.01); *G06F 16/635* (2019.01); *G06N 5/04* (2013.01); *G06N 20/00* (2019.01); *G06Q 10/10* (2013.01); *G06Q 30/0271* (2013.01); *G06Q 30/0631* (2013.01)

(58) Field of Classification Search
CPC ......... G06F 17/30053; G06F 17/30035; G06F 17/30761; G06Q 30/0271; G06Q 10/10; G06Q 30/0631
See application file for complete search history.

(56) References Cited

U.S. PATENT DOCUMENTS 5,872,850 A * 2/1999 Klein .................. G06F 17/3061
705/51
7,398,274 B2 7/2008 Ittycheriah et al. .......... 707/100
(Continued)

FOREIGN PATENT DOCUMENTS

EP 2312516 * 4/2011 ............. G06Q 30/02
WO 2012/107762 8/2012

OTHER PUBLICATIONS

"Collaborative Filtering for Implicit Feedback Datasets", Yifan Hu, Yehuda Koren, Chris Volinsky, Data Mining 2008, ICDM Eighth IEEE International Conference on Dec. 15-19, 2008, pp. 263-272.*
(Continued)

*Primary Examiner* — Ben M Rifkin
(74) *Attorney, Agent, or Firm* — Merchant & Gould P.C.

(57) ABSTRACT

Methods, systems and computer program products for periodically generating a personalized playlist of media objects based on a most recent taste profile of a user. An N-dimensional latent factor vector that defines a taste profile of a user is constructed and matched to an M-dimensional latent factor vector that defines attributes of a media object. A playlist including the first media object is generated based on the matching.

15 Claims, 10 Drawing Sheets

Related U.S. Application Data

(60) Provisional application No. 62/194,285, filed on Jul. 19, 2015.

(51) Int. Cl.
  *G06N 5/04* (2006.01)
  *G06N 20/00* (2019.01)

(56) References Cited

U.S. PATENT DOCUMENTS

| | | | |
|---|---|---|---|
| 7,627,605 | B1 | 12/2009 | Lamere et al. ............... 707/104 |
| 7,797,446 | B2 | 9/2010 | Heller et al. ................. 709/242 |
| 7,849,092 | B2 * | 12/2010 | Slaney ............. G06F 17/30026 707/713 |
| 8,260,656 | B1 | 9/2012 | Harbick et al. |
| 8,306,976 | B2 | 11/2012 | Handman et al. ............ 707/733 |
| 8,370,351 | B2 | 2/2013 | Kalasapur et al. ........... 707/733 |
| 8,407,226 | B1 | 3/2013 | Das et al. |
| 8,473,368 | B2 | 6/2013 | Gronow et al. ............. 705/26.7 |
| 8,874,574 | B2 | 10/2014 | Purdy .......................... 705/26.7 |
| 9,110,955 | B1 | 8/2015 | Bernhardsson ............... 707/748 |
| 2002/0019858 | A1 * | 2/2002 | Kaiser ............... G06F 17/30029 709/219 |
| 2006/0015193 | A1 | 1/2006 | Kato ................................ 700/2 |
| 2009/0034750 | A1 * | 2/2009 | Ayoub .................... G10L 25/69 381/77 |
| 2009/0037355 | A1 * | 2/2009 | Brave ............... G06F 17/30867 706/45 |
| 2011/0153663 | A1 * | 6/2011 | Koren ............... G06F 17/30964 707/776 |
| 2011/0295843 | A1 * | 12/2011 | Ingrassia, Jr. ..... G06F 17/30053 707/723 |
| 2012/0030020 | A1 | 2/2012 | Bucak et al. |
| 2012/0059788 | A1 * | 3/2012 | Sekino ............... G06Q 30/0282 706/52 |
| 2012/0078830 | A1 | 3/2012 | Bodor et al. |
| 2012/0303713 | A1 | 11/2012 | Harbick et al. ............... 709/204 |
| 2013/0007208 | A1 | 1/2013 | Tsui et al. |
| 2013/0159243 | A1 | 6/2013 | Wei et al. ........................ 706/54 |
| 2013/0262469 | A1 * | 10/2013 | Whitman .......... G06F 17/30029 707/741 |
| 2013/0311163 | A1 * | 11/2013 | Somekh ............... G06N 99/005 703/21 |
| 2013/0332842 | A1 | 12/2013 | Bernhardsson et al. ...... 715/738 |
| 2014/0129500 | A1 | 5/2014 | Nice et al. ....................... 706/46 |
| 2014/0214751 | A1 * | 7/2014 | Damera-Venkata ..... G06N 5/02 706/52 |
| 2014/0280181 | A1 | 9/2014 | Rodger et al. ................ 707/740 |
| 2015/0248618 | A1 | 9/2015 | Johnson .......................... 706/46 |

OTHER PUBLICATIONS

"Detecting noise in recommender system databases", Michael P. O'Mahony, Neil J. Hurley, Guenole C.M. Silvestre, Proceeding IUI 06 Proceedings of the 11th international conference on Intelligent user interfaces, Sydney, Australia, Jan. 29-Feb. 1, 2006, pp. 109-115.*

Google, *Word2vec*, https://code.google.com/p/word2vec (last visited Feb. 2, 2016).

The Echo Nest™, *Acoustic Attributes Overview*, http://developer.echonest.com/acoustic-attributes.html (last visited Feb. 2, 2016).

Scikit-Learn Developers, *Scikit Implementation* (http://scikit-learn.org/stable/modules/linear_model.html#logistic-regression) (last visited Feb. 2, 2016).

Dato, *GraphLab Createm™API—Factorization Recommender* (https://dato.com/products/create/docs/generated/graphlab.recommender.factorization_recommender.FactorizationRecommender.html) (last visited Feb. 2, 2016).

Rendle, S., *Factorization Machines*, Data Mining (ICDM), 2010 IEEE 10th International Conference on, pp. 995-1000 (Dec. 13, 2010), http://www.csie.ntu.edu.tw/~b97053/paper/Rendle2010FM.pdf.

Collaborative Filtering. Wikipedia. N.p., n.d. Web. Jul. 18, 2015. <https://en.wikipedia.org/wiki/Collaborative_filtering>.

Koren, Yehuda, Robert Bell, and Chris Volinsky. "Matrix Factorization Techniques for Recommender Systems." Computer 8 (2009): 42-49. Web. Jul. 18, 2015. <http://www2.research.att.com/~volinsky/papers/ieeecomputer.pdf>.

Johnson, Christopher C. "Logistic Matrix Factorization for Implicit Feedback Data." NIPS . Web. Jul. 18, 2015. <http://stanford.edu/~rezab/nips2014workshop/submits/logmat.pdf>.

Int'l Search Report and the Written Opinion issued in connection with Int'l Appln. No. PCT/US2016/042821 dated Aug. 31, 2016.

Koren, Y. et al., "Matrix Factorization Techniques for Recommender Systems", IEEE Computer Society, vol. 42, No. 8; pp. 30-37, (Aug. 2009).

Int'l Search Report for PCT/US2016/042821 dated Aug. 31, 2016 (3 pages).

Baccigalupo et al., "Case-Based Sequential Ordering of Songs for Playlist Recommendation", ECCBR 2006, LNAI 4106, pp. 286-300 (2006).

* cited by examiner

| User Activity Record | | | | | | | | |
|---|---|---|---|---|---|---|---|---|
| User ID | Context (e.g., Where Obtained From?) | Date(s) of Activity | Time(s) of Activity | Song Name: Artist | Added to Playlist? | Playback Length(s)/Total Track Length | Play Count | Geo Location |
| CA123 | Curated Playlist: "Dance Hits" | 6/10/2016 6/17/2016 6/24/2016 7/1/2016 7/8/2016 | 07:00 p.m. 09:00 p.m. 09:14 p.m. 10:15 p.m. 09:30 p.m. | "Got to Give it Up": "Marvin Gay" | N | 2:10/11:52 11:52/11:52 11:10/11:52 11:52/11:52 11:52/11:52 | 5 | Home Home Home Home Home |
| CA123 | Search | 6/10/2016 | 11:30 a.m. | "Sabotage": "Beastie Boys" | Y: "My Workout Playlist" | NA | NA | Gym |
| ... | ... | ... | ... | ... | ... | ... | ... | ... |

FIG. 4

SYSTEMS, APPARATUSES, METHODS AND COMPUTER-READABLE MEDIUM FOR AUTOMATICALLY GENERATING PLAYLISTS BASED ON TASTE PROFILES

CROSS-REFERENCE TO RELATED APPLICATIONS

This application is a continuation-in-part of U.S. patent application Ser. No. 14/637,209, filed on Mar. 3, 2015, entitled "System and Method for Logistic Matrix Factorization of Implicit Feedback Data, and Application to Media Environments," which claims priority to U.S. Provisional Application No. 61/947,262 filed on Mar. 3, 2014. This application also claims priority to U.S. Provisional Application No. 62/194,285 filed Jul. 19, 2015. The contents of these applications are incorporated herein by reference.

BACKGROUND OF THE INVENTION

Technical Field

The present disclosure relates generally to personalized media recommendation, and more particularly the present disclosure presents systems, apparatuses, methods and computer-readable medium for automatically generating playlists based on taste profiles.

Background

In the field of on-demand media streaming services, it is common for a media streaming application to include features that provide personalized media recommendations to a user. These features typically analyze user activity data to suggest content among a vast catalog of media that is predicted to match the listening or viewing preferences of the user.

For example, many music-streaming applications provide music recommendations in the form of curated radio stations. Typically such radio stations will play songs of a certain genre based on an initial input from the user, such as an artist or song selection. The user then typically provides positive or negative feedback for the songs chosen by the radio station, which are taken into account as the radio station curates future songs.

In other examples, music-streaming applications provide discovery or suggested listening features, in which a curated song selection is surfaced to the user when they first open the application or is otherwise featured more prominently to the user within the application.

Music-streaming applications also have employed collaborative filtering methods to predict the preferences or tastes of a user by collecting preferences or taste information from many other users.

The foregoing approaches, however, provide music recommendation that does not completely take into account the normal activities of on-demand music selection (e.g. searching, favoriting, playlist management, etc.). As a consequence, many features of the on-demand music selection experience are unavailable as part of the music recommendation experience. For example, features of playlist management, such as the ability to share a playlist, follow a playlist of another user, or save a playlist for offline listening, would typically be incompatible with or disjointed from the experience of a curated radio station. There has yet to be a technical solution for resolving this incompatibility and disjointedness with little or no user interaction.

SUMMARY

It is in view of the above considerations and others that the various embodiments of the present disclosure have been made. The embodiments described herein solve technical challenges to provide other unique and useful functions related to playlist generation that are significant. The appended independent claims address technical challenges to provide other unique and useful functions related to playlist generation that are significant.

The example embodiments described herein address the foregoing challenges by providing methods, systems and computer program products for periodically generating a personalized playlist of media objects based on a most recent taste profile of a user. Because a group of personalized recommendations are presented as a formatted playlist, the set can integrate seamlessly into the on-demand music selection experience.

An additional benefit of the example embodiments described herein includes the ability for a user to manipulate large sets of personal recommendations without manually creating a playlist. Additionally, the user can automatically receive large sets of recommendations in batched deliveries, which can be beneficial for offline listening. The music recommendation service itself also benefits from the ability to improve future recommendations based on how the user interacts with the curated playlist.

As will be appreciated, the example embodiments described herein thus provide methods, systems, apparatuses, and computer program products for generating a playlist. A first media object is selected from a media content play history of a first user. A first playlist containing the first media object is identified. A second media object that is not in the media content play history is extracted from the first playlist and a second playlist including the second media object is generated. As described in further detail below, the methods, systems, apparatuses and computer program products may be performed by (or implemented on) a device, computer server system, or a combination of both, where the client device and computer server system include processing circuitry, communication circuitry, and a memory storing at least one data message that is to be operated on.

In one example embodiment, the first media object is selected based on a time it was last played by the user. In another embodiment, the first playlist can be generated by a second user different from the first user.

In yet another embodiment, a third playlist including a third media object that is not in the media content play history and that is not in the second playlist is generated.

In another example, the second media object can be extracted based on an attribute. The attribute can include the number of plays of the second media object.

In one example, embodiment, a visual signal indicator to indicate that the second playlist is personalized is generated.

Other example embodiments described herein provide methods, systems, apparatuses, and computer program products for generating a playlist by constructing an N-dimensional latent factor vector that defines a taste profile of a user, matching the N-dimensional latent factor vector to an M-dimensional latent factor vector that defines attributes of a media object, wherein N and M are integers, and generating a playlist including the media object. In one embodiment, matching of the N-dimensional latent factor vector and the M-dimensional latent factor vector can include computing the dot product of the N-dimensional latent factor vector and the M-dimensional latent factor vectors. As described in more detail below, the methods, systems, apparatuses and computer program products may be performed by (or implemented on) a device, computer server system, or a combination of both, where the client device and computer server system include processing circuitry, communication circuitry, and a memory storing at least one data message that is to be operated on.

BRIEF DESCRIPTION OF THE DRAWINGS

The features and advantages of the example embodiments presented herein will become more apparent from the detailed description set forth below when taken in conjunction with the following drawings.

FIG. 4 illustrates an example user activity record according to an example embodiment.

DETAILED DESCRIPTION

In accordance with some embodiments systems, apparatuses, methods and computer program products are described for periodically generating a personalized playlist of media objects based on latent factors derived from one or more user activity records. In addition, activity associated with the generated personalized playlist is fed back into the recommendation system to generate new personalized playlists by iteratively training the models used to generate the recommendations incorporated into the playlists.

Figure 1:
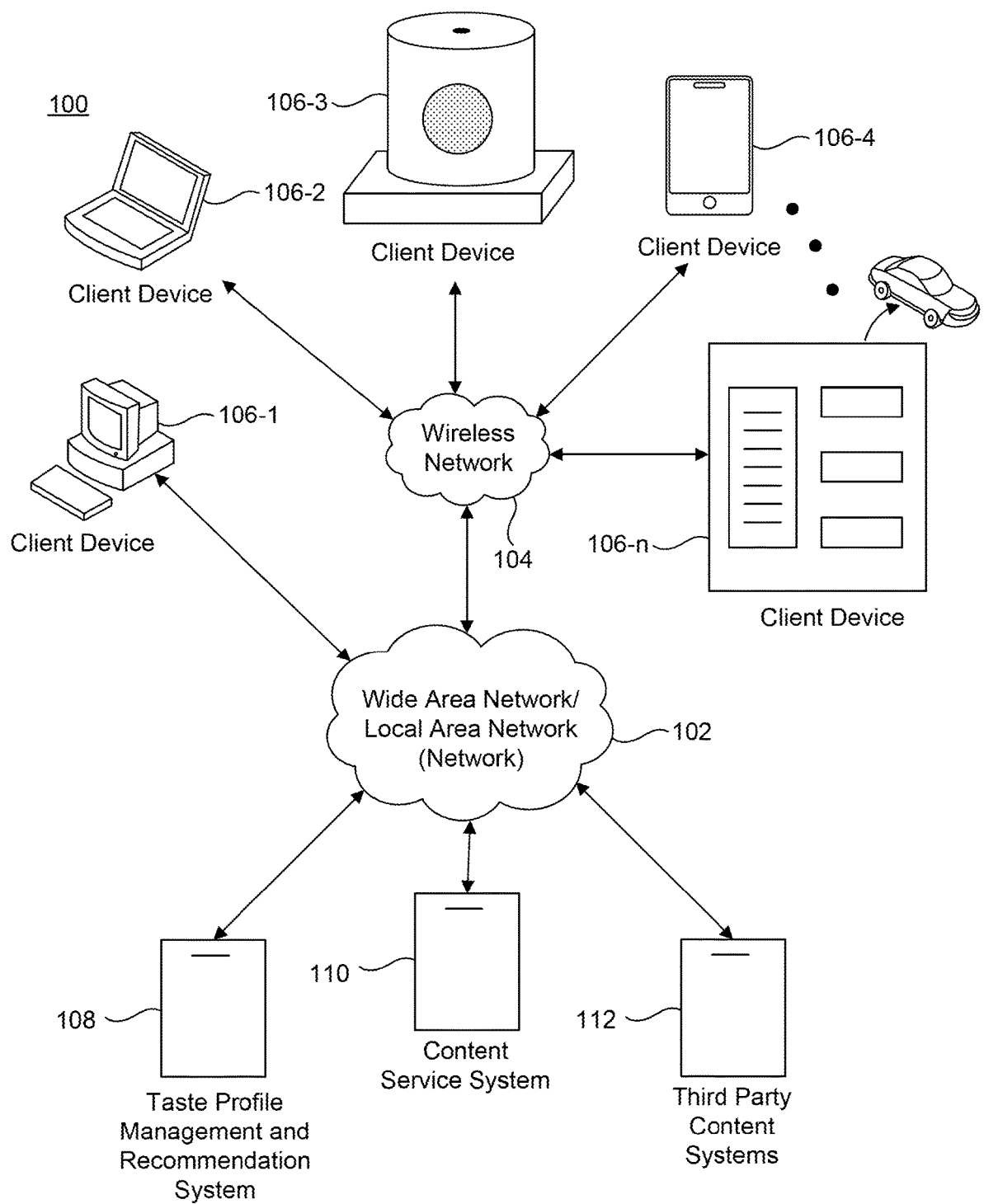
FIG. 1 is a representative view of a system in which some embodiments of the invention may be implemented.

FIG. 1 is a representative view of a system 100 in which some embodiments of the invention may be implemented. Not all the components are required to practice the invention, and variations in the arrangement and type of the components may be made without departing from the spirit or scope of the invention. System 100 particularly is an environment constructed to automatically collect large quantities of user activity data and media content data and to generate and publish playlists.

System 100 of FIG. 1 includes wide area networks/local area networks ("LANs/WANs")—(network) 102, wireless network 104, client devices 106-1, 106-2, 106-3, 106-4, . . . , 106-n (referred to collectively and individually as client device 106) a taste profile and recommendation management system 108, a content service system 110 and one or more third party content systems 112.

Wireless network 104 is configured to communicatively couple client devices 106 and their components with network 102. Wireless network 104 may include any of a variety of wireless sub-networks that may further overlay stand-alone ad-hoc networks, and the like, to provide an infrastructure-oriented connection for client devices 106. Such sub-networks may include mesh networks, wireless LAN (WLAN) networks, cellular networks, and the like. Other now or future known types of access points can be used in place of network 102 and wireless network 104.

Generally, taste profile management and recommendation system 108 operates to collect user activity, train models, generate user taste vectors (also referred to herein as a latent factor vector) and provide recommendations that, in turn, are used to generate playlists. Content service system 112 operates to provide content to client devices 106 according to the playlists generated by taste profile management and recommendation system 108. In various embodiments, such content may include, but is not limited to media content such as music, podcast, video, games, books and the like, as well as webpage content, advertisements, professionally generated content (non-UGC content), search results, blogs, and/or any of a variety of user generated content for access by another client device. In an example embodiment, the taste profile and recommendation management system 108 generates playlists which contain lists of media objects that are used by a client device 106 to retrieve content from content service system 110 (e.g., by streaming, downloading, and the like).

Third party content systems 112 provide documents such as news, blogs, as well as content (e.g., images) associated with users for which the playlists are generated.

Figure 2:
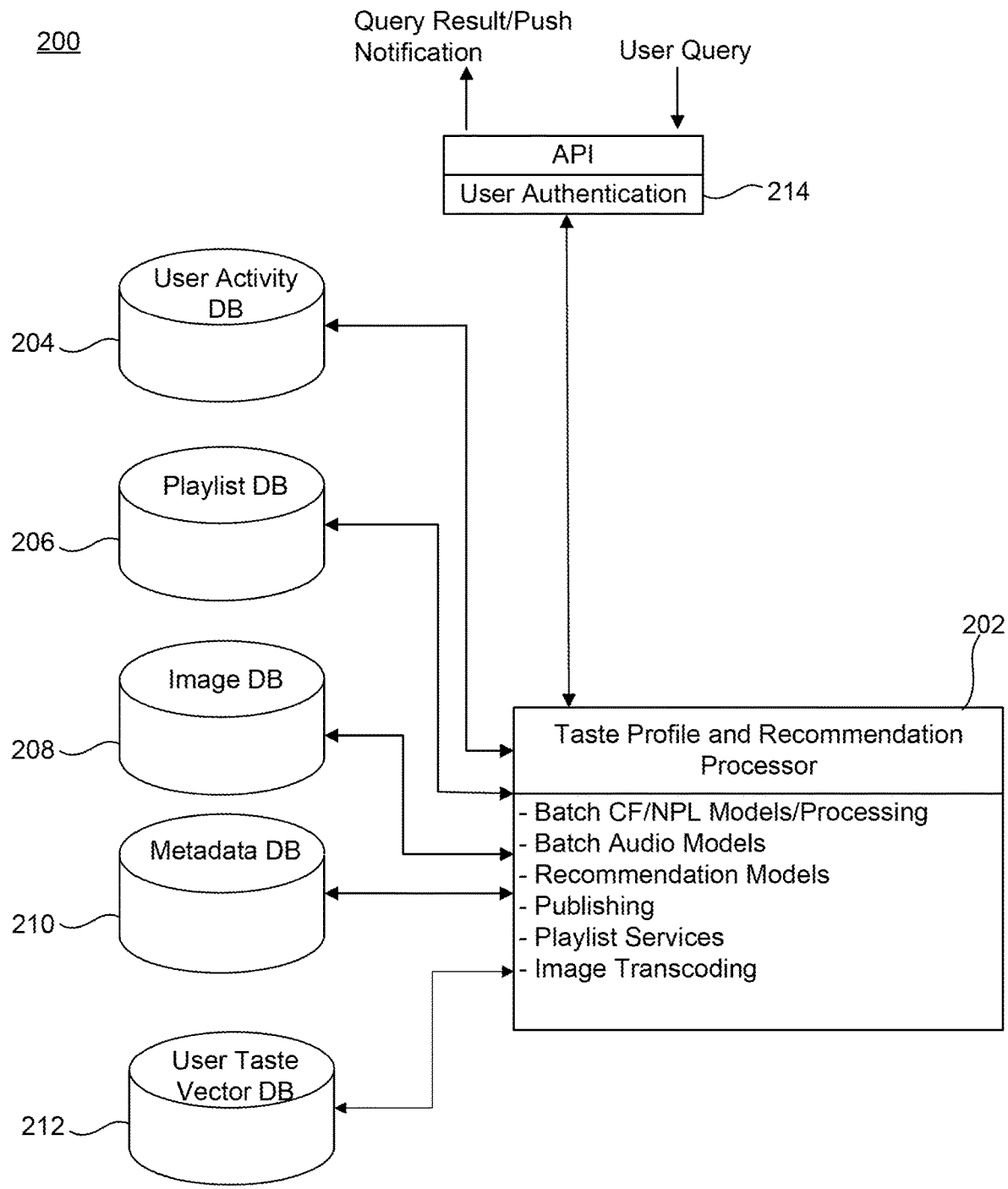
FIG. 2 is a representative view of a taste profile and recommendation management system according to an example embodiment.

FIG. 2 is a representative view of a taste profile and recommendation management system 200 (e.g., taste profile management and recommendation system 108 of FIG. 1) according to an example embodiment. Taste profile management and recommendation system 200 includes an application programming interface (API) 214 that is used to communicate with a client device (e.g., client device 106 of FIG. 1) to receive or transmit information. In addition, API 214 may present a user interface to a client device or interact with a client device to receive input and display output.

Taste profile management and recommendation system 200 also includes one or more processors (processor(s)) 202 that control processing including taste profile analysis, batch processing and recommendation analysis. In one embodiment, processor(s) 202 perform batch processing on various latent factor models, such as collaborative filtering (CF) processing using CF models and natural language processing (NLP) using NLP models.

The models can also be trained based on acoustic data, where the acoustic data includes data derived from the raw audio, image or video information of media objects. This data can also include, for example, semantic scores provided by music intelligence and data platforms. Semantic scores for quantifying properties of raw audio data include, for example, scores quantifying acousticness, beat strength, bounciness, danceability, dynamic range, energy, flatness, instrumentalness, liveness, loudness, mechanical features, organic features, speechiness, or valence.

User activity database 204 contains records of user activity that are indicative of music taste (or other tastes) of users. Generally, the types of activity stored in user activity database 204 include interactions with a client device 106, location of the client device, buttons on the client device that have been pressed, time of the activity, and the like. An exemplary user activity database 204 is the open source relational database management system (RDBMS) that runs as a server providing multi-user access to a number of databases named MySQL. An example user activity record stored in user activity database 204 is described below in connection with FIG. 4.

Playlist database 206 contains a collection of playlists, each playlist being a list of media content (e.g., a list of songs, videos, movies, etc.) that can be used by a media device (e.g., client device 106 of FIG. 1) to playback media content. The playlist stored in playlist database 206 can be playlists generated by the embodiments described herein, curated playlists, playlists generated by other users, and the like.

Image database 208 stores images that can be associated with user taste profiles (e.g., a user taste vector associated with a user). The image content can be stored on image database 208 by, for example, a user or obtained from a third party service (e.g., the Facebook® social networking service).

Metadata database 210 contains metadata about the media content, such as song or video titles, artist names, song or video durations, song genre, artists, playlists, associated album titles, and the like. As will be described in more detail below, metadata, among other information, can be fed to models (e.g., latent factor models) to provide recommendations.

A taste profile can be associated with a user and automatically updated to maintain an in-depth understanding of the music activity and preference(s) of that user, enabling personalized recommendations, taste profiling and a wide range of social music applications. Generally, this is accomplished by using processor(s) 202 to process the user activity records in user activity database 204 on latent factor models to generate user taste vectors which, in turn, are stored in user taste vector database 212.

The user taste vectors stored in user taste vector database 212, the metadata stored in metadata database 210 and the playlists stored in playlist database 206 are then processed by processor(s) 202 to generate recommendations. Once recommendations have been generated by processor(s) 202, they are published in the form of a playlist.

In one embodiment, a client device 106 (FIG. 1) collects user activity information and context information. The activity information and context information is stored in allocated memory. The processor of the client device, in turn, executes code which causes to be generated messages containing the user activity information, the context information, or a combination of both and transmits the messages (e.g., periodically or in realtime) onto wireless network 104 (FIG. 1), network 102 (FIG. 1) or a combination of both. The messages are transmitted to taste profile management and recommendation system 200 for processing. This activity data can be communicated by the client device 106, for example, by using API 214. Taste profile and recommendation system 200, in turn, processes the activity information and/or context information and generates playlists with recommendations.

In one embodiment, taste profile and recommendation system 200 generates a playlist from the activity it receives from client device by constructing an N-dimensional latent factor vector that defines a taste profile of a user, matching the N-dimensional latent factor vector to an M-dimensional latent factor vector that defines attributes of a media object, wherein N and M are integers, and generating a playlist including the media object. The N-dimensional latent factor vector and the M-dimensional latent factor vector can be matched computing the dot product of the N-dimensional latent factor vector and the M-dimensional latent factor vectors. In turn, taste profile and recommendation system 200 publishes the recommendations (e.g., in the form of playlists) it has generated as described below in connection with FIG. 3.

In another embodiment, a client device 106 (FIG. 1) collects user activity information associated with media content play history. The activity information is stored in allocated memory. The processor of the client device, in turn, executes code which causes to be generated messages containing the user activity information and transmits the messages (e.g., periodically or in realtime) onto wireless network 104 (FIG. 1), network 102 (FIG. 1) or a combination of both. The messages are transmitted to taste profile management and recommendation system 200 for processing. This activity data can be communicated by the client device 106, for example, by using API 214. Taste profile and recommendation system 200, in turn, selects a first media object from a media content play history of a first user, identifies a first playlist containing the first media object, extracts from the first playlist a second media object that is not in the media content play history, and generates a second playlist including the second media object. Taste profile and recommendation system 200, for example, can select the first media object, based on a time it was last played by the user. The first playlist also can be generated by a second user different from the first user. Taste profile and recommendation system 200 also can generate a third playlist including a third media object that is not in the media content play history and that is not in the second playlist. In turn, taste profile and recommendation system 200 publishes the recommendations (e.g., in the form of playlists) it has generated as described below in connection with FIG. 3.

Figure 3:
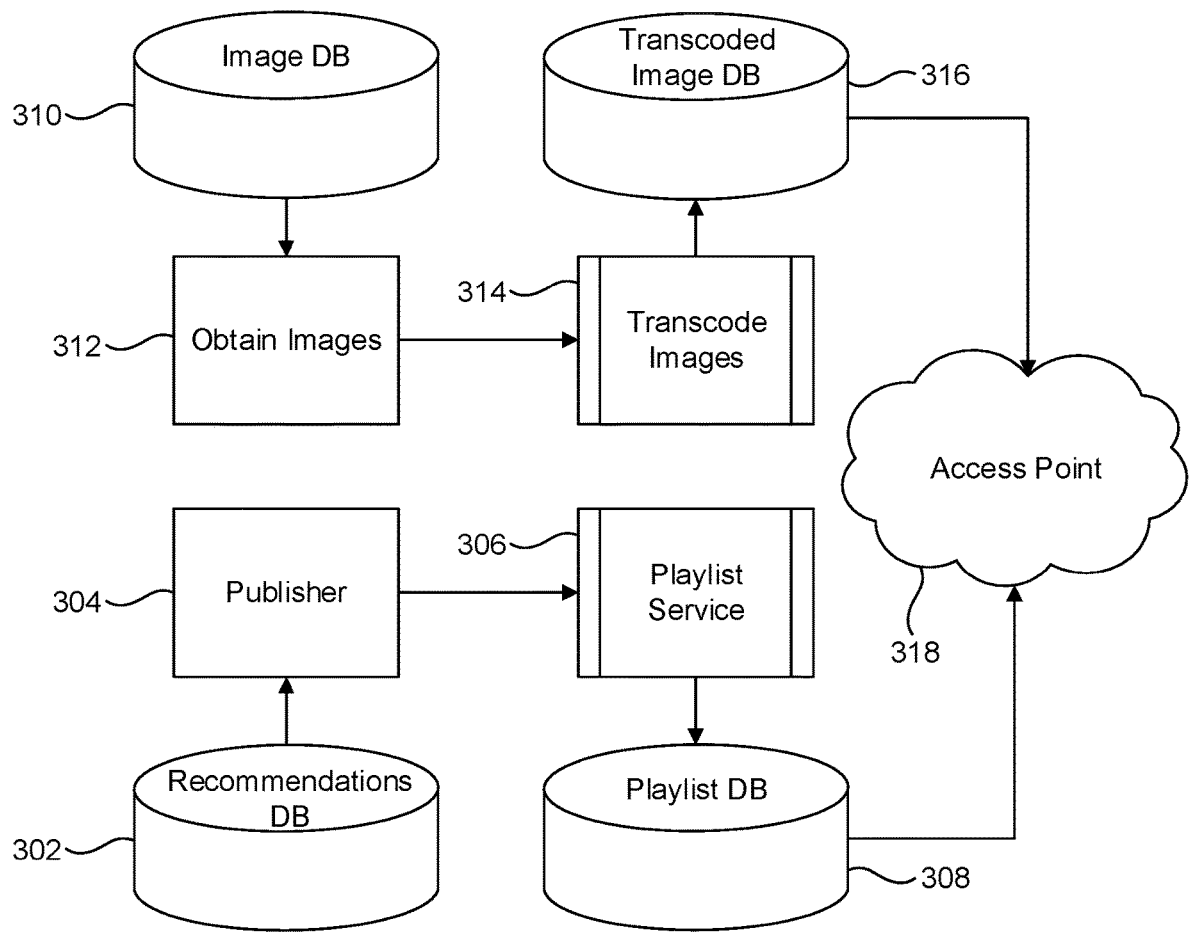
FIG. 3 is a flowchart showing a publishing workflow according to an example embodiment.

FIG. 3 is a flowchart showing a publishing workflow in accordance with an embodiment. As shown in FIG. 3, recommendations database 302 stores recommendations generated by taste profile management and recommendation system 200 (FIG. 2). Images to be associated with users are stored in image database 310 (e.g., image database 208 of FIG. 2). Image database 208 can be populated by, for example, retrieving images from third party services, such as the Facebook® social networking service which provides a mechanism (e.g., an API) that allows other services to retrieve images (e.g., profile images) of its users.

A publisher 304 publishes the recommendations stored in recommendations database 302 to a playlist service 306. Playlist service 306, in turn, stores the recommendations in the form of personalized playlists in a playlist database 308 that is accessible to users through an access point 318. Playlist service 306 includes a timing component (e.g., a timer, a scheduler, or the like) that causes a personalized playlist updates to be published at one or more predetermined times, for example, based on the time zone in which the user resides. In one embodiment, the playlists generated based on the recommendations stored in recommendations database 302 are associated with the images that have been stored in image database 310. The recommendations and images can be published in parallel. This permits, for example, a user interface image (e.g., an icon, thumbnail, or other visual indicator) to be associated with the generated playlist so that it is identifiable to a user.

The images that are obtained from the image database 310 are transcoded (e.g., by a transcoder) to resize and format the images in a manner that allows them to be presented onto a platform that receives and uses the personalized playlists stored in playlist database 308. The transcoded images are stored in a transcoded image database 316.

The transcoded images and published personalized playlists are, in turn, made available to client devices 106 (FIG. 2) via an access point 318 (e.g., networks 102, 104 of FIG. 1).

In one embodiment, a processor of taste profile and recommendation system 200 causes a playlist of media objects to be publish periodically (e.g., hourly, daily, weekly, etc.).

FIG. 4 illustrates an example user activity record 420 stored in user activity database 204 (FIG. 2). Generally, user activity record 420 contains records of user activity (e.g., input provided through the user interface of client device 106 in connection with a media object streaming application executed by the client device) and a wide range of information defining the context in which such activity was performed (e.g., a playlist in which a user maintains, a curated playlist, a radio station, a search result, etc.). The example user activity record 420 shown in FIG. 4, has fields containing a user identifier 422, the context in which the activity was performed 424 (e.g., from where a song selection was obtained), the date(s) of the activity 426, time(s) of the activity 428, the name of the song and artist 430, whether the artist (or, for example, a particular track of the artist) was added to a playlist and if so, the title of the playlist 432 to which the artist (or track) was added, the playback length of the song 434 and the total length of the track (if applicable), how many times the activity was performed 436 (if applicable), the geographic location where the activity (or moment) occurred 438 (e.g., gym, home, while running, work, during commute, etc.). Thus, the activity taste profile data includes, in addition to the particular activities of the user, the context within which such activities occurred. It should be understood that the structure (e.g., format, particular fields, type of user activities, arrangement, etc.) of such a user activity record can be modified and still be within the scope of the invention.

In the example user activity record 420 illustrated in FIG. 4, a first user activity record item 420a identifies the context in which the activity was performed 424 as being a song selected from a curated playlist ("Dance Hits"), the date(s) of the activity 426, and the time(s) of the activity 428. The first user activity record item 420a also indicates that the particular track of the artist was not added to any other playlist 432 and that the playback length of the song 434 varied from about 2 minutes to over 11 minutes out of a possible 11 minute 52 second track length. The geographic location where the activity occurred 438 is identified as being at the home of the user.

A second example user activity record item 420b in FIG. 4 indicates that the context 424 in which the activity was performed was a search. The song which was obtained from the search was added to a personal playlist called "My Workout Playlist" and that this activity was performed at a gym (432, 438). Another activity record indicating how many times the song was listened to can also be included in record 420.

User activity records are used to generate user taste vectors containing latent factors. The user activity records provide signals that indicate the level of intention in the action of a user. The signals can thus be referred to as intent signals. For example, the actions of searching for a song or adding a song to a playlist provide high intent signals (e.g., example 420b above), while more passive actions such as listening to a song from a curated radio station provide low intent signals (e.g., example 420a above). The user taste vectors thus include latent factors based on these intent signals in the user activity history. In some examples, the intent signals are weighted by context and/or time decay. Thus the more intentful the activity, the more weight is assigned to it. For example, a search for a particular song that has been performed numerous times (e.g., more than two times) is weighted relatively higher than activities that are predetermined to provide lower intent signals, such as listening to a song numerous times, where the song is in a curated playlist the user listens to often.

As described above, the latent factors defining a user taste profile are informed by signals outside the user activity history as well.

In an example embodiment, one or more methods of latent factor modeling, such as collaborative filtering, conventionally known now or in the future, are used to construct the user taste vectors based on signals in the user activity records. It should be understood by those skilled in the art that other methods of latent factor modeling can be used to construct user taste vectors and still be within the scope of the invention.

In some example embodiments, a user taste vector is defined by a single latent factor vector of, for example, N-dimensions. In other example embodiments, the user taste vector is defined by a combination of latent factor vectors.

As will be explained in more detail below, the latent factors that make up the user taste vector are factors that are inferred from the user activity record attributes that have been observed and processed.

In addition, a user taste vector can also contain third party data about users (anonymous or otherwise) via the use of key-value information such as non-activity-related information (e.g., gender, age, and the like).

In addition, priority or preference values for a particular song or artist can be contained in the user taste vector and can be weighted more heavily if, for example, an artists or song is listened to more frequently, or if a user has identified favorite artists or songs.

While the disclosure refers mainly to using musical data such as artist name or song title for purposes of clarity, it should be understood that the disclosure is not limited thereto. In particular, another media preference (e.g., book, movie or game preference) can be used instead of, or in combination with, musical data. For example, number of views or reads, mentions from social media networks, user settings, playlists or favorites lists can be obtained by crawling or mining this information from the web or other user data to determine preferences related to types of content other than music, for example, books, movies or games. Thus, according to the invention, the data set and corresponding terms and weights can be one of a musical data set, a book data set, a movie data set, a game data set, or some combination thereof.

In one example, the user taste vector database 212 (FIG. 2) is updated continuously. For example, a user activity record in user activity database 204 is added when a user listens to a new song, and the record is updated when an update of the user preference for the song is received via a client device 106 (FIG. 1). This activity, in turn, causes processor(s) 202 to update the corresponding user taste vector in user taste vector database 212.

In one embodiment, the activity information received from the client device 106 (FIG. 1) is stored in the user activity database 204, the correct "matched" metadata is added, and a play count is initialized. For example, a user taste vector update with "Britney Spears—Oops" gets resolved to the actual song ID and metadata for "Britney Spears" and "Oops, I Did It Again", with a play count of 1. If a fingerprint code (e.g., an audio fingerprint code) is sent to initialize a user taste vector item, the system 200 can resolve the fingerprint code to metadata and discard the fingerprint code.

Referring again to FIG. 2, user taste vector database 212 contains user taste vectors indicating the music taste (or other tastes) of users. Each user taste vector is a representation of musical activity, and may include a wide range of information. User taste vector database 212 can be implemented as one or more relational databases or in any other way that allows fast query processing and scaling.

The embodiments described herein allow user taste vectors to be used to determine an individual's taste(s), for example for the purpose of making recommendations or playlists based on the individual's taste(s).

More specifically, the playlist generation process involves the construction of a taste profile of the user defined by one or more observable (i.e. explicit) and/or latent (i.e. hidden) features calculated from the activity history of the user, including contextual and/or temporal information related to the activity of the user. The playlist generation process further involves construction of an attribute profile of a media item in a media catalog using latent factor modeling such as collaborative filtering, natural language processing, or a combination of both. In such examples, the attribute profile is similarly defined by one or more observable and/or latent features of the media item. Such metadata can be stored, for example, in metadata database 210 (FIG. 2).

In some examples, the latent factors defining an attribute profile of a media item are informed by media item signals. These signals may include, for example, signals based on cultural information about the media item or signals based on the underlying audio content of the media item (e.g., obtained by using acoustic analysis).

In another embodiment, plural client devices 106 (FIG. 1) are configured to collect user activity information associated with play history in the form of media content play history records. The activity information is, in turn, stored in respective allocated memory in each of the client devices. The processor of each client device, in turn, executes code which causes to be generated messages containing the user activity information and transmits the messages (e.g., periodically or in realtime) onto wireless network 104 (FIG. 1), network 102 (FIG. 1) or a combination of both. The messages are transmitted to taste profile management and recommendation system 200 for processing. This activity data can be communicated by the client device 106, for example, by using API 214. The plurality of media content play history records are stored in a playlist database. A new playlist is, in turn, generated by the taste profile management and recommendation system 200 by selecting a first media object from a media content play history of a first user, identifying a first playlist containing the first media object, extracting from the first playlist a second media object that is not in the media content play history, and generating a second playlist including the second media object. In this embodiment, a first attribute profile of the first media object is defined by a first set of latent factors, a second attribute profile of a second media item is defined by a second set of latent factors and the second playlist is generated according to one or more relationships between the first set of latent factors and the second set of latent factors. The recommendations (e.g., in the form of a playlist) are, in turn, published as described above with respect to FIG. 3.

In another embodiment, a playlist is generated by the taste profile management and recommendation system 200 by selecting a first media object from a media content play history of a first user, identifying a first playlist containing the first media object, extracting from the first playlist a second media object that is not in the media content play history, and generating a second playlist including the second media object. In this example embodiment, an N-dimensional latent factor vector that defines the attributes of the first media object is constructed. The N-dimensional latent factor vector is, in turn, matched to an M-dimensional latent factor vector that defines attributes of the second media object, where N and M are integers. The second media object is selected based on the closeness of the match. The recommendations (e.g., in the form of playlists) are, in turn, published as described above with respect to FIG. 3.

In other embodiments, multiple latent factor models are ensembled together for a richer taste profile of a user. This is performed, for example, by combining multiple models using ensemble techniques, such as Gradient Boosted Decision Trees or Logistic Regression, where a dataset of explicit user taste preference data (e.g., such as radio thumbs up and down) is used as ground truth data (i.e., training data) to train the ensemble model.

A playlist of media objects can be generated using the constructed user taste vector and media attribute profile. In an example system implementing the playlist generation process disclosed herein, user taste vectors are constructed periodically (e.g. hourly, daily, weekly, etc.) by a back end server through offline batch computations using data collected from user activity history collected from one or more client devices. Playlists based on the user taste vectors are similarly generated periodically through offline batch computations and the resulting playlist data is stored as static content in a remote database (e.g., playlist database 308; FIG. 3). When the personalized playlist data is requested by a client device 106, the static content is pushed by a back end service (e.g., by processor(s) 202 of taste profile management and recommendation system 108) to the client device. In an example embodiment, referring back to FIG. 2, functionally, API 214 takes the request from a client device 106 (FIG. 1), and authenticates users included in the request against a user authorization database (not shown). Upon successful authentication, the request is passed to processor(s) 202. Processor(s) 202 perform processing to fulfill the request and sends the processing result back to the network, the API 214 outputs the processing result to the client device. Alternatively if the client device is configured to receive notifications, processor(s) 202 can push (i.e., communicate) such notifications to the client device via API 214.

In other example systems, construction of the user taste vectors and generation of the playlists are performed in real-time as opposed to in batch computations.

A visual signal indicator can be generated on the client device (e.g., through a display or other user interface) to provide a visual notification (e.g., to a user) that a personalized playlist has been generated based on a user taste vector.

Figure 5:
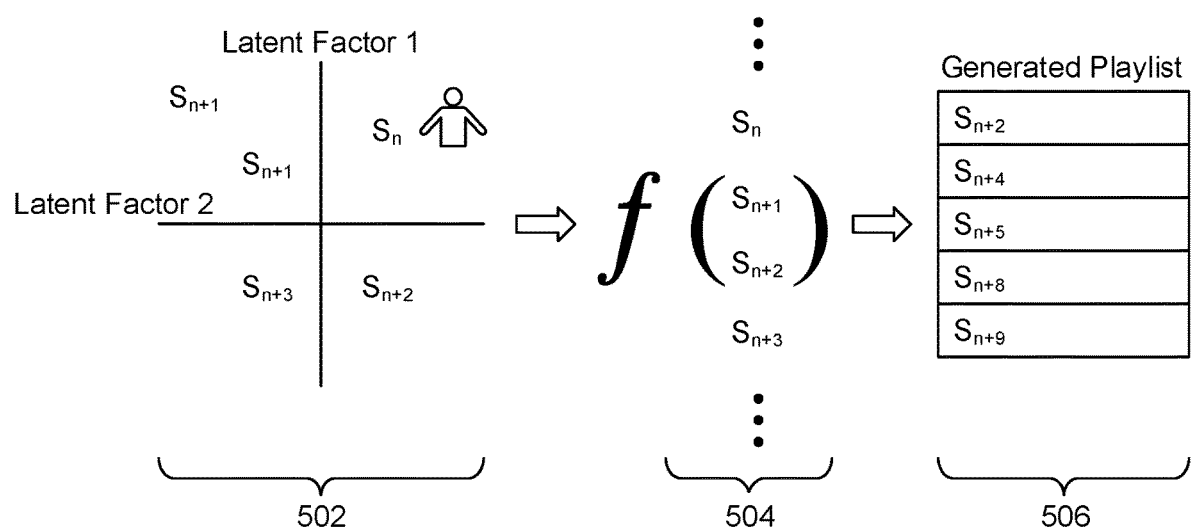
FIG. 5 illustrates an example process for generating a playlist of media content using collaborative filtering according to an example embodiment.

FIG. 5 illustrates an example process for generating a playlist of media content using collaborative filtering according to an example embodiment. Particularly, FIG. 5 illustrates a simplified example of a user taste profile (e.g., the user taste vector or latent factor vector) and attribute profiles for several media objects in two dimensions. Referring to graph 502, the two dimensions are characterized as latent factor 1 (Latent Factor 1) and latent factor 2 (Latent Factor 2).

FIG. 5 shows an example of where a user taste profile and several attribute profiles ($S_n$, $S_{n+1}$, $S_{n+2}$, $S_{n+3}$, etc.) might fall on these two dimensions. In this example, a user's predicted taste or preference for a media object is equal to the dot product of the user's taste profile (e.g., the user taste vector or latent factor vector) and the media object attribute profile locations on the graph. Several media objects are shown to be selected based on this computation. FIG. 5 depicts a subsequent step in which a function 504 is applied to the selected subset of media objects to generate a playlist 506 of one or more desired characteristic. For example, a playlist could be generated with a predetermined total length. In another example, the media objects in a generated playlist could be filtered or ordered based on observable or latent factors such as the date the media objects were recorded or the tempo of the media objects.

Signals that are determined to be noise or that are determined to provide inaccurate indications of observable or latent factors can be filtered out during the construction of the user taste vectors.

In one example embodiment, natural language processing algorithms or tools can be used to learn media content item (e.g. song) embeddings (i.e., vectors of latent factors). In an example embodiment, media objects in playlists can be treated as words and the playlists themselves as documents. The natural language processing tools can be used to map the media objects in the playlists to vectors learned from a large a large corpus of user playlist data. For example, vector representations of the identifiers (IDs) of the media content items in a playlist can be generated by learning the context and relationships between the IDs as found in the large corpus of playlist. Each media object is represented as a vector in a d-dimensional space, and each dimension quantifies a latent feature of the relationship the vectors have with one another (e.g., by comparing one vector to another). A vector of latent features can thus collectively be used to represent the similarities one media object has to another media object.

In accordance with another example embodiment, usage data reflecting implicit feedback is collected in an observation matrix. A logistic function is then used to determine latent factors that indicate whether particular users are likely to prefer particular items. Exemplary use cases include providing personalized recommendations, such as personalized music recommendations, or generating playlists of popular artists.

In accordance with an embodiment, each entry in an observation matrix represents the number of times that a particular user has interacted with a particular item. For example, if $U=(u_1, \ldots, )$ is a group of n users, and $I=(i_1, \ldots, i_m)$ is a group of m items, then an observation matrix $R=(r_{ui})_{n \times m}$ can be determined wherein each entry $r_{ui} \in R \geq 0$ represents the number of times that user u has interacted with item i.

In accordance with an embodiment, the observation matrix can be factorized by lower-dimensional matrices $X_{n \times f}$ and $Y_{m \times f}$ wherein f is a number of latent factors, the rows of X are latent factor vectors that represent a user's taste, and the columns of $Y^T$ are latent factor vectors that represent an item's implicit characteristics. The user and item vectors can be initially configured with random noise, and an alternating gradient ascent procedure performed, including alternating between solving for the vectors while modifying the observation matrix according to a gradient. During each iteration, the system can solve for item vectors using solved user vectors, and solve for user vectors using solved item vectors. After completing a number of iterations, latent factors can be determined for users and items. The latent factors can then be used to determine recommendations, for example one or more items for a user with which they have not yet interacted, i.e., for which $r_{ui}=0$, but which they are likely to enjoy based on the latent factors.

In accordance with an embodiment, the process can be adapted for parallel processing and for scale, including sharding the observation matrix and vectors into partitions, working locally with each partition using a data collection and aggregation processor, such as an Apache Hadoop environment, and then joining or otherwise combining the results of each partition.

In accordance with an embodiment, the observation matrix can be factorized by lower-dimensional matrices $X_{n \times f}$ and $Y_{m \times f}$ wherein f is a number of latent factors, the rows of X are latent factor vectors that represent a user's taste, and the columns of $Y^T$ are latent factor vectors that represent an item's implicit characteristics.

In accordance with an embodiment, this relationship can be modeled by a logistic function. If $l_{u,i}$ denotes the event that user u has chosen to interact with item i (i.e., user u prefers item i), then the probability of this event occurring can be distributed according to a logistic function parameterized by the sum of the inner product of user and item latent factor vectors, and user and item biases:

$$p(l_{ui} | x_u, y_i, \beta_i, \beta_j) = \frac{\exp(x_i y_i^T + \beta_u + \beta_i)}{1 + \exp(x_u y_i^T + \beta_u + \beta_i)} \quad (1)$$

In accordance with an embodiment, the $\beta_i$ and $\beta_j$ terms represent user and item biases which account for variation in behavior across both users and items. Some users may have a tendency to interact with a diverse assortment of items in I, while others may only interact with a small subset. Similarly, some items may be very popular and have a high expectation of being interacted with across a broad audience, while other items may be less popular and only apply to a niche group. The bias terms are latent factors associated with each user u∈U and item I∈i that offset the behavior and popularity biases. Given this formulation, the non-zero entries of the observation matrix $r_{ui} \neq 0$ represent positive observations, and the zero entries $r_{ui}=0$ represent negative observations. Additionally, a measure of confidence in the entries of R can be defined, where α is a tuning parameter, as:

$$c=\alpha r_{ui} \quad (2)$$

Each nonzero element $r_{ui} \neq 0$ serves as $c=\alpha r_{ui}$ positive observations, and each zero element $r_{ui}=0$ serves as a single negative observation. Increasing α places more weight on the non-zero entries, while decreasing α places more weight on the zero entries. Choosing α to balance the positive and negative observations generally yields better results. In accordance with other embodiments, other confidence functions can replace c. To remove the power user bias that comes from a dataset where a small minority of users contribute the majority of the weight, a log scaling function can be used, such as:

$$c=1+\alpha \log(1+r_{ui}/\epsilon) \quad (3)$$

By making the assumption that all entries of R are independent, the system can derive the likelihood of observations R given the parameters X, Y, and β as:

$$\mathcal{L}(R | X, Y, \beta) = \prod_{u,i} p(l_{ui} | x_u, y_i, \beta_u, \beta_i)^{\alpha r_{ui}} (1 - p(l_{ui} | x_u, y_i, \beta_u, \beta_i)) \quad (4)$$

In accordance with an embodiment, zero-mean spherical Gaussian priors can be placed on the user and item latent factor vectors to regularize the model and avoid over-fitting to the training data:

$$p(X \mid \sigma^2) = \prod_u N(x_u \mid 0, \sigma_u^2 I), \; p(Y \mid \sigma^2) = \prod_i N(y_i \mid 0, \sigma_i^2 I) \quad (5)$$

Taking the log of the posterior, and replacing constant terms with a scaling parameter λ, the following can be determined:

$$\log p(X, Y, \beta \mid R) = \sum_{u,i} \alpha r_{ui}(x_u y_i^T + \beta_u + \beta_i) - \quad (6)$$

$$(1 + \alpha r_{ui}) \log(1 + \exp(x_u y_i^T + \beta_u + \beta_i)) - \frac{\lambda}{2} \|x_u\|^2 - \frac{\lambda}{2} \|y_i\|^2$$

Then, the process can attempt to learn the X, Y, and β that maximize the log posterior (6). A local maximum of the objective defined below in (7) can be found by performing an alternating gradient ascent procedure:

$$\arg\max X, Y, \beta \; \log p(X, Y, \beta \mid R) \quad (7)$$

In accordance with an embodiment, in each iteration the system first fixes the user vectors X and biases β, and takes a step towards the gradient of the item vectors Y and biases β. Next, the system fixes the item vectors Y and biases β, and takes a step towards the gradient of the user vectors X and biases β. The partial derivatives for the user vectors and biases can be given by:

$$\frac{\partial}{\partial x_u} = \sum_i \alpha r_{ui} y_i - \frac{y_i(1 + \alpha r_{ui})\exp(x_u y_i^T + \beta_u + \beta_i)}{1 + \exp(x_u y_i^T + \beta_u + \beta_i)} \quad (8)$$

$$\frac{\partial}{\partial \beta_u} = \sum_i \alpha r_{ui} - \frac{(1 + \alpha r_{ui})\exp(x_u y_i^T + \beta_u + \beta_i)}{1 + \exp(x_u y_i^T + \beta_u + \beta_i)} \quad (9)$$

Each iteration is linear in the number of users |U| and items |I|, which for larger domains this can become a limitation. In situations where linear computation is not possible, then fewer negative samples ($r_{ui}=0$) can be sampled, together with a decreased α in response. This provides enough approximation that near-optimal vectors can be solved with much less computation time. Additionally, the number of iterations required for convergence can be greatly reduced by choosing the gradient step sizes adaptively. For example, if $x_u^t$ denotes the value of $x_u$ at iteration t, and $g_{x_u}^t$ denotes the gradient of $x_u$ at iteration t, then at iteration t the following update to $x_u$ can be performed:

$$x_u^t = x_u^{t-1} + \frac{\gamma g_u^{t-1}}{\sqrt{\sum_{t'=1}^{t-1} g_u^{t'2}}} \quad (10)$$

Each iteration of the alternating gradient descent procedure includes computing the gradient for all latent factor vectors, and then taking a step towards the positive direction of the gradient. Each of these gradients includes sum of a set of functions that each depend on a single user and item.

Figure 6:
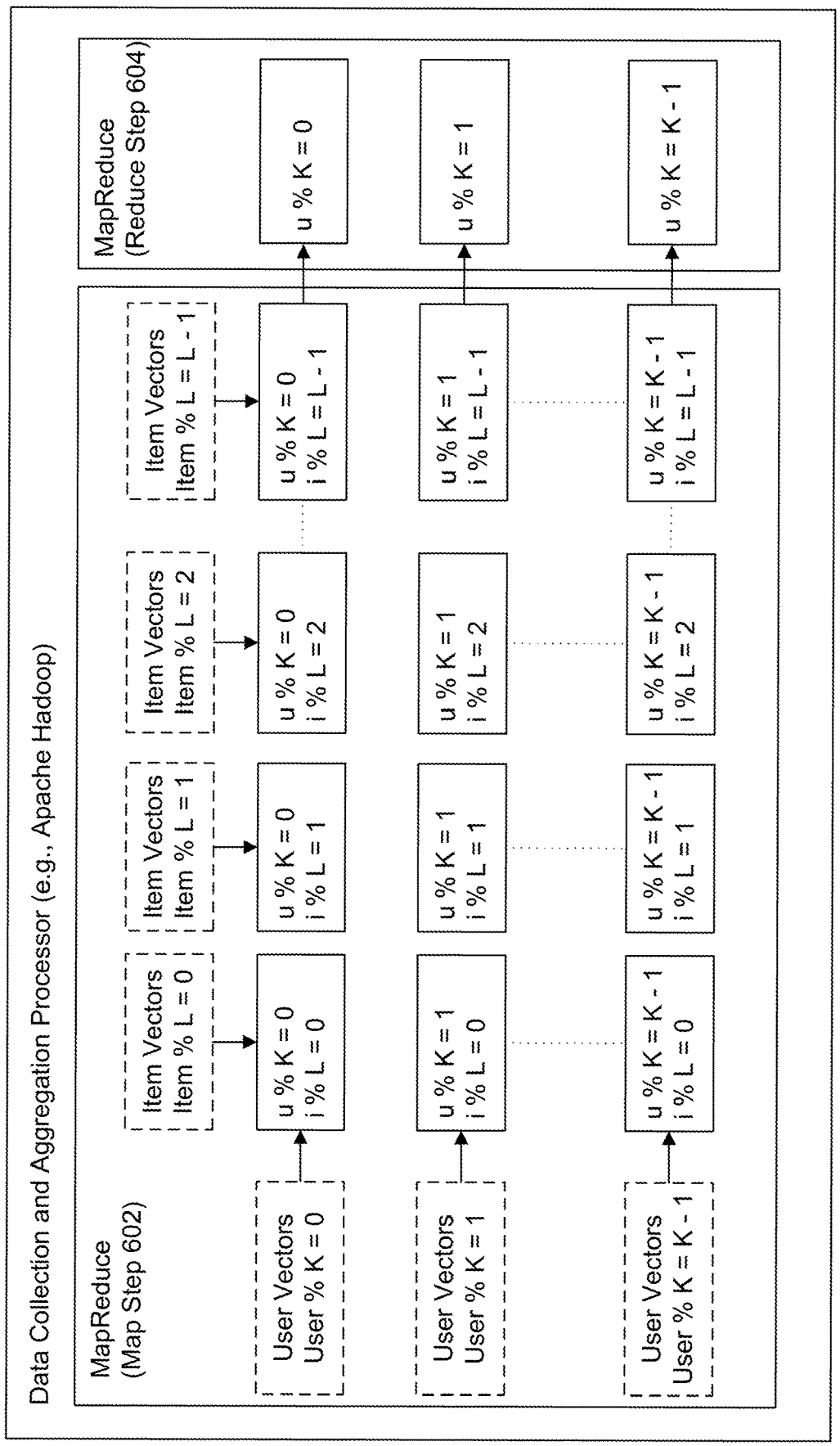
FIG. 6 illustrates the use of sharding, in accordance with an example embodiment.

FIG. 6 illustrates the use of sharding, in accordance with an example embodiment. As shown in FIG. 6, the system can employ a sharding technique to shard the observation matrix R, in which R is first partitioned into K×L blocks of K rows and L columns, where K<<n and L<<m are parallelization factors.

Additionally, the user X matrix is partitioned into K blocks and the item Y matrix into L blocks. Each block depends on at most n/K users and m/L items, so even if the full observation matrix R and set of user and item matrices X and Y cannot fit in memory, parallelization factors K and L can be selected such that each block can fit in memory.

In accordance with an embodiment, in the map phase 602, all observations $r_{ui}$, user vectors $x_u$, and item vectors y from the same block are provided to the same mapper. For each pair of users and items (u and i), the following is computed in parallel:

$$v_{ui} = \alpha r_{ui} y_i - \frac{y_i(1 + \alpha r_{ui})\exp(x_u y_i^T + \beta_u + \beta_i)}{1 + \exp(x_u y_i^T + \beta_u + \beta_i)} \quad (11)$$

$$b_{ui} = \alpha r_{ui} - \frac{(1 + \alpha r_{ui})\exp(x_u y_i^T + \beta_u + \beta_i)}{1 + \exp(x_u y_i^T + \beta_u + \beta_i)} \quad (12)$$

In accordance with an embodiment, in the reduce phase 604, the system can key off u (or off i if performing an item iteration), such that each $v_{ui}$ and $b_{ui}$ that map to the same user u (or to the same item i if performing an item iteration) are sent to the same reducer. It follows that $\partial/\partial x_u = \Sigma_i v_{ui}$, and $\partial/\partial \beta_u = \Sigma_i b_{ui}$ and so these summations can be efficiently aggregated in parallel in the reduce phase. Finally, once the partial derivatives $\partial/\partial x_u$ and $\partial/\partial \beta_u$ have been computed, the system can update $x_u$ and $\beta_u$.

Figure 7:
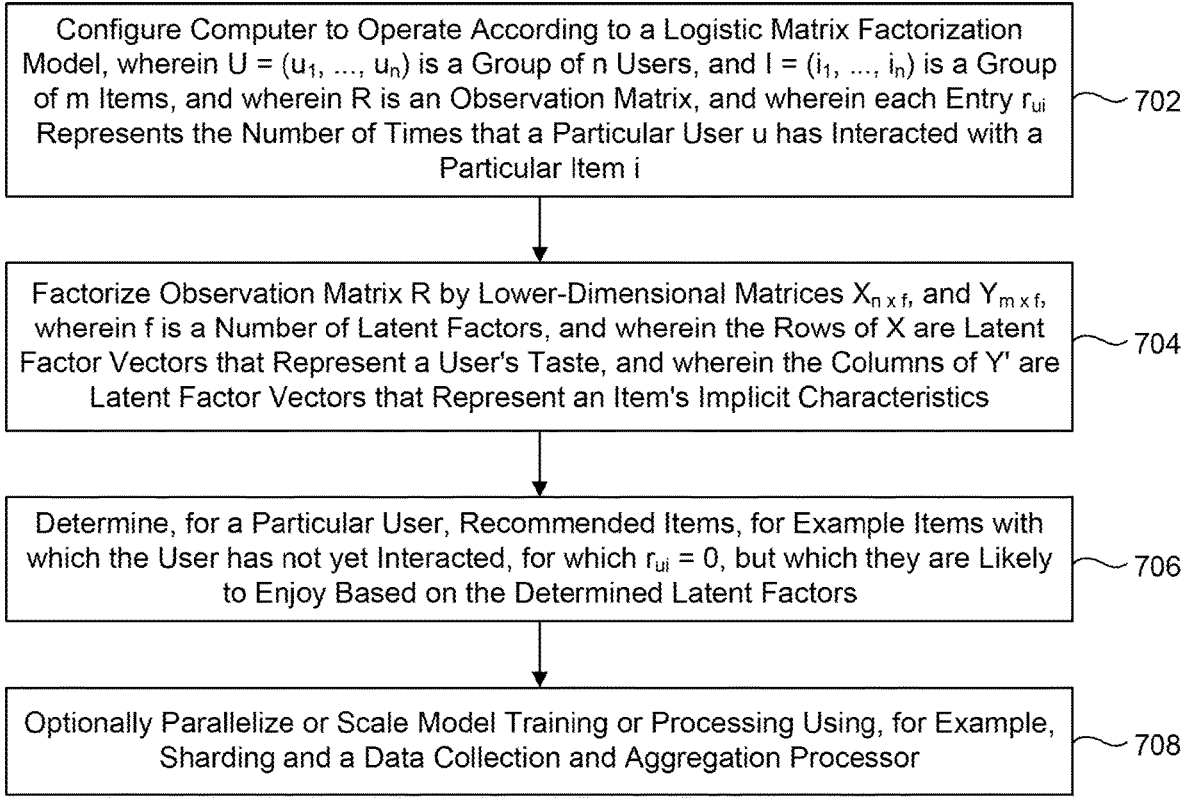
FIG. 7 illustrates a method of providing logistic matrix factorization for implicit feedback data, in accordance with an example embodiment.

FIG. 7 illustrates a method of providing logistic matrix factorization for implicit feedback data, in accordance with an embodiment. As shown in FIG. 7, at step 702, a logistic matrix factorization model is generated, wherein $U=(u_1, \ldots, u_n)$ is a group of n users, and $I=(i_1, \ldots, i_m)$ is a group of m items, and wherein R is an observation matrix, and wherein each entry in the observation matrix $r_{ui}$ represents the number of times that a particular user u has interacted with a particular item i.

At step 704, an observation matrix R is factorized by lower-dimensional matrices $X_{n \times f}$ and $Y_{m \times f}$, wherein f is a number of latent factors, and wherein the rows of X are latent factor vectors that represent a user's taste, and wherein the columns of $Y^T$ are latent factor vectors that represent an item's implicit characteristics.

At step 706, for a particular user, recommended items are determined, for example items with which the user has not yet interacted, for which $r_{ui}=0$, but which they are likely to enjoy based on the latent factors.

At step 708, the method can optionally include parallelizing or scaling model training using, for example, sharding and a data collection and aggregation processor (e.g., an Apache Hadoop environment).

In another embodiment, the processes continue to iterate once the recommendation model has been implemented. In other words, the recommendation model continues to obtain feedback based on activity data (e.g., the data collected in taste profile records).

Figure 8:
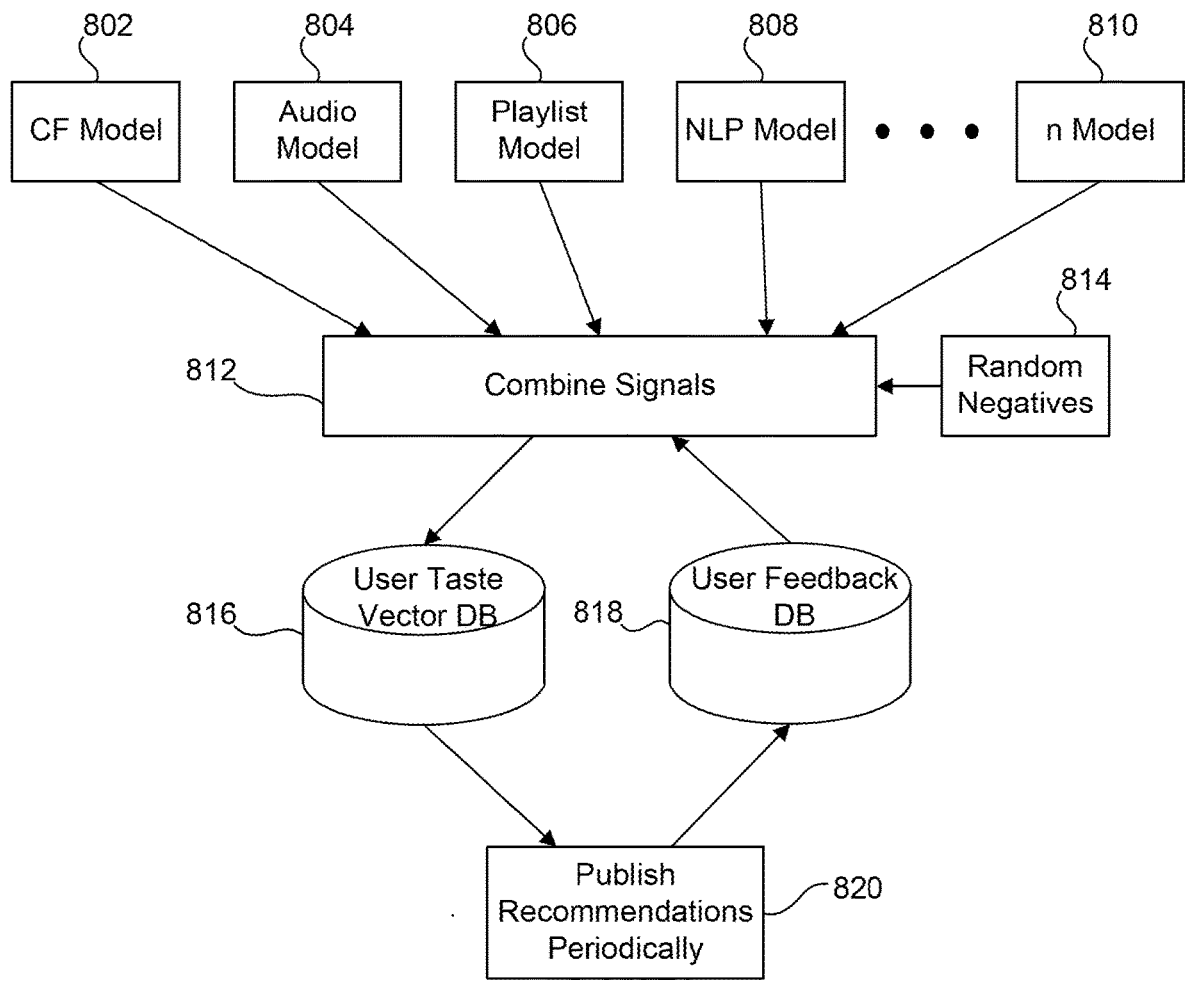
FIG. 8 illustrates an iteration flow in according to an example embodiment.

FIG. 8 illustrates an iteration flow in accordance with an embodiment. Once the latent factor modeling (e.g., collaborative filtering models 802, audio models 804, playlist models 806, natural language processing models 808 and other latent factor models 810) are trained, they are used to determine signals from user activity. As explained above, these signals may include, for example, intent signals that indicate the level of intention in the action of a user. The signals include, for example, track signals, user signals, song popularity, how recent the popularity is, whether the user wishes to listen to new content or older content, and the like.

All of these signals are combined as shown by block 812. In one embodiment, the models are continuously trained to adjust the weights that are applied to the signals. New or updated taste profiles stored in user taste vector database 816. Recommendations are then published as shown by block 820. As users implement the recommendations by selecting the playlist generated based from the recommendations, their feedback is recorded in user feedback database 818. Such feedback can include skips, saves, length of playback, etc. This feedback is fed back into the latent factor models that are combined in block 812. The feedback loop thus continuously re-trains the models, which, in turn, allows for new recommendations to be generated based on updated playlists presented to the applicable user (e.g., via a client device of the user).

Presentation bias associated with the feedback data is diminished by sampling random negatives as shown in block 814. In one embodiment, explicit feedback is augmented with random negatives. In turn, the feedback augmented with the random negatives is used as training data in the combination process of batch models. The updated recommendations are, in turn, published as described above.

Figure 9:
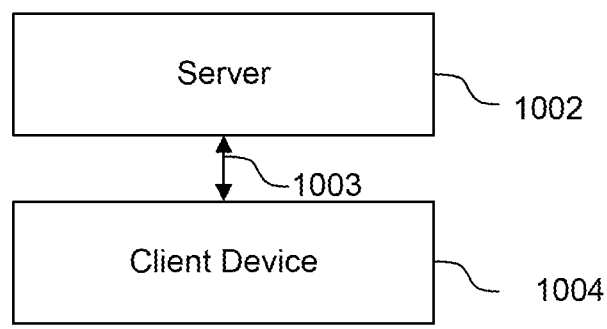
FIG. 9 is a block diagram of an example client-server data system configured in accordance with the principles of the invention.

FIG. 9 is a block diagram of an example client-server data system 900 configured in accordance with the principles of the invention. Data system 900 can include server 1002 and client device 1004. In some embodiments, data system 900 can include multiple servers 1002, multiple client devices 1004, or both multiple servers 1002 and multiple client devices 1004. For simplicity, only one server 1002 and one client device 1004 are illustrated.

Server 1002 may include any suitable types of servers that can store and provide data to client device 1004 (e.g., file server, database server, web server, or media server). Server 1002 can store data, and server 1002 can receive data download requests from client device 1004.

In some embodiments, server 1002 can obtain and process data from one or more client devices 1004.

Server 1002 can communicate with client device 1004 over communications link 1003. Communications link 1003 can include any suitable wired or wireless communications link, or combinations thereof, by which data may be exchanged between server 1002 and client 1004. For example, communications link 1003 can include a satellite link, a fiber-optic link, a cable link, an Internet link, or any other suitable wired or wireless link. Communications link 1003 may enable data transmission using any suitable communications protocol supported by the medium of communications link 1003. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 1004 (e.g., any one of clients 106 described above in connection with FIG. 1) can include any electronic device capable of communicating and/or displaying or providing data to a user and may be operative to communicate with server 1002 (e.g., taste profile management and recommendation system 108/200 and content service system 110 described above in connection with FIGS. 1 and 2). For example, client device 1004 can include a portable media player, a cellular telephone, pocket-sized personal computers, a desktop computer, a laptop computer, and any other device capable of communicating via wires or wirelessly (with or without the aid of a wireless enabling accessory device).

Figure 10:
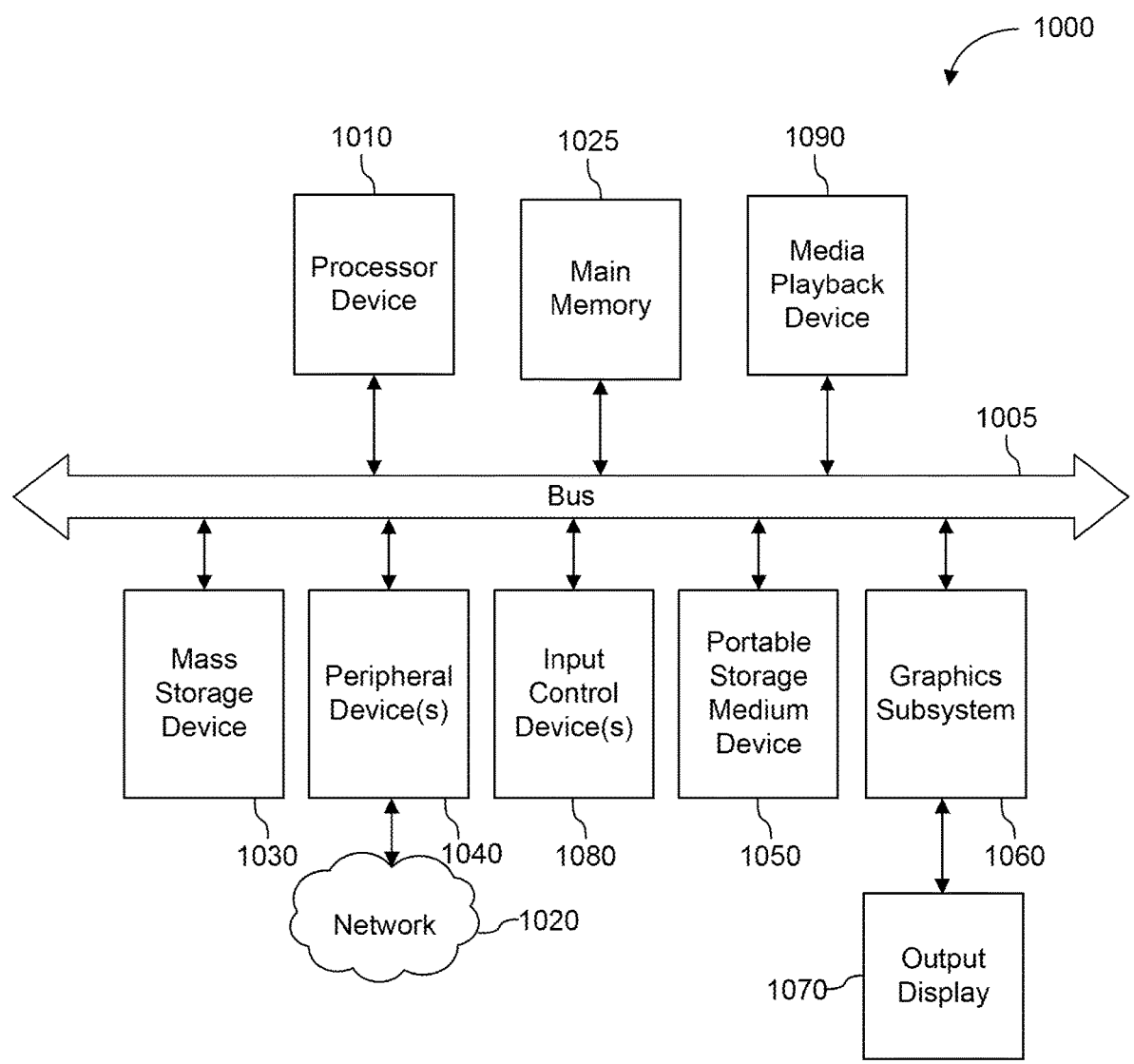
FIG. 10 is a block diagram of a general and/or special purpose computer, which may be a general and/or special purpose computing device, in accordance with some of the example embodiments of the invention.

FIG. 10 is a block diagram of a general and/or special purpose computer 1000, which may be a general and/or special purpose computing device, in accordance with some of the example embodiments of the invention. The computer 1000 may be, for example, the same or similar to client device (e.g., 1004, FIG. 9), a user computer, a client computer and/or a server computer (e.g., 1002, FIG. 9), among other things, or can be a device not operative to communicate with a server.

The computer 1000 may include without limitation a processor device 1010, a main memory 1025, and an interconnect bus 1005. The processor device 1010 may include without limitation a single microprocessor, or may include a plurality of microprocessors for configuring the computer 1000 as a multi-processor system. The main memory 1025 stores, among other things, instructions and/or data for execution by the processor device 1010. The main memory 1025 may include banks of dynamic random access memory (DRAM), as well as cache memory.

The computer 1000 may further include a mass storage device 1030, peripheral device(s) 1040, portable non-transitory storage medium device(s) 1050, input control device(s) 1080, a graphics subsystem 1060, and/or an output display interface 1070. For explanatory purposes, all components in the computer 1000 are shown in FIG. 10 as being coupled via the bus 1005. However, the computer 1000 is not so limited. Devices of the computer 1000 may be coupled via one or more data transport means. For example, the processor device 1010 and/or the main memory 1025 may be coupled via a local microprocessor bus. The mass storage device 1030, peripheral device(s) 1040, portable storage medium device(s) 1050, and/or graphics subsystem 1060 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is configured for loading contents of the mass storage device 1030 into the main memory 1025.

The portable storage medium device 1050 operates in conjunction with a nonvolatile portable storage medium to input and output data and code to and from the computer 1000. In some embodiments, the software for storing information may be stored on a portable storage medium, and may be inputted into the computer 1000 via the portable storage medium device 1050. The peripheral device(s) 1040 may include any type of computer support device, such as, for example, an input/output (I/O) interface configured to add additional functionality to the computer 1000. For example, the peripheral device(s) 1040 may include a network interface card for interfacing the computer 1000 with a network 1020.

The input control device(s) 1080 provide a portion of the user interface for a user of the computer 1000. The input control device(s) 1080 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 1000 may include the graphics subsystem 1060 and the output display 1070. The output display 1070 may include a display such as a CSTN (Color Super Twisted Nematic), TFT (Thin Film Transistor), TFD (Thin Film Diode), OLED (Organic Light-Emitting Diode), AMOLED display (Active matrix organic light-emitting diode), and/or liquid crystal display (LCD)-type displays. The displays can also be touchscreen displays, such as capacitive and resistive-type touchscreen displays.

The graphics subsystem 1060 receives textual and graphical information, and processes the information for output to the output display 1070.

Each component of the computer 1000 may represent a broad category of a computer component of a general and/or special purpose computer. Components of the computer 1000 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine or computer-readable medium may include, but is not limited to, floppy diskettes, optical disks, CDROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Input control devices 1080 can control the operation and various functions of computer 1000.

Input control devices 1080 can include any components, circuitry, or logic operative to drive the functionality of computer 1000. For example, input control device(s) 1080 can include one or more processors acting under the control of an application.

When computer 1000 performs the functionality of the taste profile management and recommendation system 200 described above in connection with FIG. 2, mass storage device 1030 additionally stores modules that perform latent factor processing, recommendation processing, publishing, playlist services, and image transcoding as described above.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is only limited by the claims which follow. Features of the disclosed embodiments can be combined and rearranged in various ways.

What is claimed is:

1. A computer-implemented method for generating playlists, comprising the steps of:
    receiving activity records associated with a media content play history of a user, the activity records containing activity information based on actions of the user and context information defining a context in which each of the actions was performed;
    retrieving intent signals from the activity records, the intent signals indicating a level of intention in the actions of the user, wherein the level of intention is based, in part, on the context information;
    selecting a first media object from the media content play history;
    constructing an N-dimensional latent factor vector based on the activity records and the intent signals associated with the first media object, wherein N is an integer and the N-dimensional latent factor vector defines attributes of the first media object,
    identifying a first playlist including the first media object;
    identifying, within the first playlist, a second media object that is not in the media content play history and has attributes defined by an M-dimensional latent factor vector, wherein M is an integer and the M-dimensional latent factor vector matches the N-dimensional latent factor vector based on one or more relationships between the latent factor vectors;
    generating a second playlist including the second media object;
    recording feedback associated with interactions of the user with the first playlist and the second playlist;
    feeding the feedback to at least one latent factor model used to construct any one of (i) the N-dimensional latent factor vector, (ii) the M-dimensional latent factor vector, or (iii) a combination of (i) and (ii); and
    updating the second playlist using the at least one latent factor model.

2. The method according to claim 1, wherein the step of identifying, within the first playlist, the second media object comprises computing a dot product of the N-dimensional latent factor vector and the M-dimensional latent factor vector to determine the M-dimensional latent factor vector matches the N-dimensional latent factor.

3. The method according to claim 1, further comprising the step of:
    publishing the first playlist and the second playlist onto a playlist database accessible over a network.

4. The method according to claim 1, further comprising the step of:
    filtering out noise during the construction of the N-dimensional latent factor vector.

5. The method according to claim 1, further comprising the step of:
    generating a visual signal indicator to provide a visual notification that a personalized playlist has been generated based on the N-dimensional latent factor vector.

6. A system for generating playlists, comprising:
    one or more processors configured to:
        receive activity records associated with a media content play history of a user, the activity records containing activity information based on actions of the user and context information defining a context in which each of the actions was performed;

retrieve intent signals from the activity records, the intent signals indicating a level of intention in the actions of the user, wherein the level of intention is based, in part, on the context information;

select a first media object from the media content play history;

construct an N-dimensional latent factor vector based on the activity records and the intent signals associated with the first media object, wherein N is an integer and the N-dimensional latent factor vector defines attributes of the first media object, identify a first playlist including the first media object;

identify, within the first playlist, a second media object that is not in the media content play history and has attributes defined by an M-dimensional latent factor vector, wherein M is an integer and the M-dimensional latent factor vector matches the N-dimensional latent factor vector based on one or more relationships between the latent factor vectors;

generate a second playlist including the second media object;

record feedback associated with interactions of the user with the first playlist and the second playlist;

feed the feedback to at least one latent factor model used to construct any one of (i) the N-dimensional latent factor vector, (ii) the M-dimensional latent factor vector, or (iii) a combination of (i) and (ii); and update the second playlist using the at least one latent factor model.

7. The system according to claim 6, wherein the one or more processors are further configured to compute the dot product of the N-dimensional latent factor vector and the M-dimensional latent factor vector.

8. The system according to claim 6, wherein the one or more processors are further configured to publish the first playlist and the second playlist onto a playlist database accessible over a network.

9. The system according to claim 6, wherein the one or more processors are further configured to filter out noise during the construction of the N-dimensional latent factor vector.

10. The system according to claim 6, wherein the one or more processors are further configured to generate a visual signal indicator to provide a visual notification that a personalized playlist has been generated based on the N-dimensional latent factor vector.

11. A non-transitory computer readable storage medium storing one or more programs, the one or more programs comprising instructions, which, when executed by an electronic device with one or more processors, cause the electronic device to perform the steps of:

receiving activity records associated with a media content play history of a user, the activity records containing activity information based on actions of the user and context information defining a context in which each of the actions was performed;

retrieving intent signals from the activity records, the intent signals indicating a level of intention in the actions of the user, wherein the level of intention is based, in part, on the context information;

selecting a first media object from the media content play history;

constructing an N-dimensional latent factor vector based on the activity records and the intent signals associated with the first media object, wherein N is an integer and the N-dimensional latent factor vector defines attributes of the first media object, identifying a first playlist including the first media object;

identifying, within the first playlist, a second media object that is not in the media content play history and has attributes defined by an M-dimensional latent factor vector, wherein M is an integer and the M-dimensional latent factor vector matches the N-dimensional latent factor vector based on one or more relationships between the latent factor vectors;

generating a second playlist including the second media object;

recording feedback associated with interactions of the user with the first playlist and the second playlist;

feeding the feedback to at least one latent factor model used to construct any one of (i) the N-dimensional latent factor vector, (ii) the M-dimensional latent factor vector, or (iii) a combination of (i) and (ii); and updating the second playlist using the at least one latent factor model.

12. The computer-readable storage medium of claim 11, further having stored thereon a sequence of instructions for causing the one or more processors to perform:

computing the dot product of the N-dimensional latent factor vector and the M-dimensional latent factor vector.

13. The computer-readable storage medium of claim 11, further having stored thereon a sequence of instructions for causing the one or more processors to perform:

publishing the first playlist and the second playlist onto a playlist database accessible over a network.

14. The computer-readable storage medium of claim 11, further having stored thereon a sequence of instructions for causing the one or more processors to perform:

filtering out noise during the construction of the N-dimensional latent factor vector.

15. The computer-readable storage medium of claim 11, further having stored thereon a sequence of instructions for causing the one or more processors to perform:

generating a visual signal indicator to provide a visual notification that a personalized playlist has been generated based on the N-dimensional latent factor vector.

* * * * *